United States Patent [19]
Barylak et al.

[11] Patent Number: 4,969,062
[45] Date of Patent: Nov. 6, 1990

[54] GROUND FAULT PROTECTION CIRCUIT

[75] Inventors: Jeffery T. Barylak, Palatine; Mark X. Stavropoulos, Libertyville; Brian R. Kemper, Chicago, all of Ill.

[73] Assignee: Motorola, Inc., Schaumburg, Ill.

[21] Appl. No.: 358,968

[22] Filed: May 30, 1989

[51] Int. Cl.$^5$ .............................................. H02H 3/16
[52] U.S. Cl. ....................................... 361/42; 361/58; 361/79; 361/86; 361/87
[58] Field of Search ................. 361/42, 58, 86, 79, 361/87, 100; 307/10.7

[56] References Cited
U.S. PATENT DOCUMENTS

| 4,150,413 | 4/1979 | Nevem | 361/86 |
| 4,654,568 | 3/1987 | Mansmann | 318/280 |
| 4,695,914 | 9/1987 | Ohtsuki et al. | 361/42 |

Primary Examiner—Todd E. DeBoer
Attorney, Agent, or Firm—Phillip H. Melamed

[57] ABSTRACT

The output terminals (15, 16) of an analog sensor (14) are monitored by a microprocessor (17). The microprocessor is DC coupled to a main analog ground terminal (16) of the sensor, while also separately being connected to a main power ground terminal (13) at which ground reference potential is provided to the microprocessor. A resistor (38), a semiconductor switch (36) and a printed circuit board metalization trace (35) provide a normal low resistance connection between the main analog sensor ground terminals (20) and the main power ground terminal (13). Current sensing circuitry (33) limits the current passed through the low resistance connection and thereby prevents excessive current from damaging printed circuit board metalization paths (34, 35) connecting the sensor analog ground terminal (16) to the main power ground terminal (13). Also, additional circuitry (32) is provided for independently sensing the voltage at the main analog sensing ground terminal (20) and preventing an excessive voltage at this terminal from being coupled (via 22) to the microprocessor. During non fault operation, the above provides low resistance, low offset voltage connections between the sensor output terminals (15, 16) and the microprocessor (17).

15 Claims, 1 Drawing Sheet

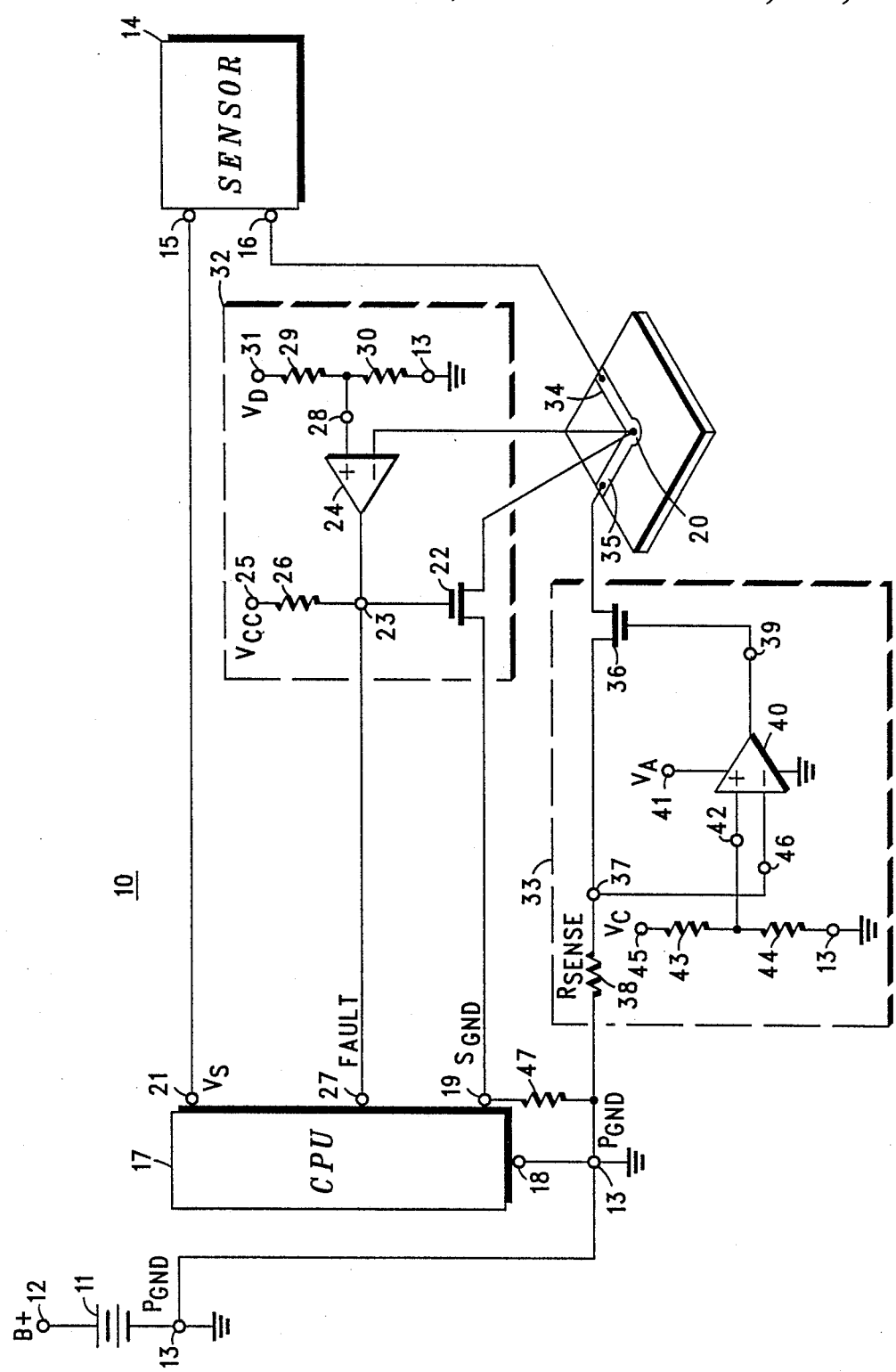

GROUND FAULT PROTECTION CIRCUIT

BACKGROUND OF THE INVENTION

The invention generally relates to the field of protection circuits which prevent circuit failures due to excessive current and/or excessive voltage. The present invention has particular application to such protection circuits used by a microprocessor which monitors the output of an analog sensor wherein the microprocessor receives an analog sensor ground signal from the sensor in addition to a main power ground signal directly connected to the microprocessor's own internal ground reference potential.

In prior circuits, often the ground potential of a sensor is separate from the main system power ground potential. Thus microprocessors which effectively monitor the output of the sensor receive an analog sensor ground reference potential from the sensor in addition to receiving a power ground reference potential which corresponds to the main ground reference potential of the microprocessor. Typically the analog sensor ground potential and the main power ground potential are at substantially the same voltage potential and a low resistance connection is provided therebetween to insure this occurrence. In such prior systems, faults can occur resulting in the analog sensor ground potential substantially differing from the main power ground potential. This can occur, when such a system is in a battery powered automobile electronic environment, when the analog sensor ground terminal is accidently connected to a nongrounded battery potential. In such a case, a very large current is passed through the low resistance connection and any printed circuit board metalization paths which connect the low resistance connection between the main analog sensor ground terminal and the power ground terminal. This can result in burning up a printed circuit board metalization path, which is sometimes also referred to as a "trace", and providing a permanent open circuit connection whereas typically an effective short circuit connection is desired. In addition, a substantial voltage at the main analog sensor ground terminal may cause damage to the microprocessor regardless of the current which exists external to the microprocessor between the main analog sensor ground terminal and the power ground terminal. Some prior sensor monitoring systems prevent excessive current in the ground connections by providing a substantial resistance and/or offset voltages between the main analog sensor ground terminal and the power ground terminal, but such systems cause inaccuracies in measuring the voltage produced by the sensor.

Some prior protection circuits have utilized fuses or other types of circuit breakers to prevent excessive current caused by a ground fault. In general, other protection circuits, other than ground fault protection circuits, have utilized voltage limiting devices such as zener diodes so as to prevent excessive voltage. However, typically only current limiting protection circuits have been utilized to prevent excessive current between analog sensor ground and power ground connections. Thus failures caused by overvoltage during a ground fault condition may still occur. Also, typically such protection circuits which utilize relays, fuses or circuit breakers are expensive and do not provide for any rapid resuming of normal operation when a detected fault ceases to exist.

SUMMARY OF INVENTION

An object of the present invention is to provide an improved protection circuit which overcomes most of the deficiencies of prior protection circuits noted above.

In one embodiment of the present invention a protection circuit is provided. The protection circuit includes a main analog sensor ground terminal at which normally ground potential is provided by a sensor circuit and a main power ground terminal, separate from said main analog sensor ground terminal, at which ground potential is provided. The protection circuit includes a monitoring circuit which has at least first and second separate input terminals each being separately coupled to the main analog sensor ground terminal and main power ground terminal respectively. A low resistance connection is normally provided between the main analog sensor ground terminal and said main power ground terminal. In this protection circuit the improvement comprises the combination of a current sensing means for sensing current passed through the low resistance connection, developing a signal magnitude indicative thereof and utilizing this signal magnitude to limit the current to no more than a predetermined maximum current limit, and an additional means, in addition to said current sensing means, for sensing the voltage at said main analog sensing ground terminal and, in response thereto, preventing the voltage at the first input terminal from exceeding a predetermined maximum voltage.

Preferably in the above described embodiment the monitoring circuit comprises a microprocessor and components of the current sensing means and the additional means are provided on a printed circuit board having at least one printed circuit board metalization path comprising part of the low resistance connection between the analog sensor ground terminal and the power ground terminal. With this configuration, the protection circuit will prevent destruction of the printed circuit board metalization path due to excessive current flowing therein in the event of a fault which results in the analog sensor ground terminal being connected to a potential substantially different than the potential at the main power ground terminal. In addition, damage to the microprocessor caused by overvoltage applied to the microprocessor input terminal, which terminal is coupled to the analog sensor ground terminal, is prevented. Preferably, both the current sensing and additional means of the present invention function by utilizing series connected semiconductor switches which prevent damage by selectively providing open circuits to prevent the excessive passage of current and the coupling of overvoltage to the microprocessor. In this manner, in the event that the fault condition ceases, the protection circuit will effectively reset itself and reestablish the desired low resistance connection between the analog sensor ground terminal and the main power ground terminal.

Preferably, the overvoltage and overcurrent protection of the present invention is accomplished, during normal operation, without providing any significant voltage offset or series resistance between the main analog sensor ground terminal and the microprocessor input sensor ground terminal.

The above features and advantages of the present invention, as well as additional features and advantages, are explained in the subsequent more detailed description of the preferred embodiment of the present invention.

BRIEF DESCRIPTION OF THE DRAWING

For a more complete understanding of the invention, reference should be made to FIG. 1 of the drawing which is a schematic diagram of a protection circuit embodying the present invention.

DESCRIPTION OF THE PREFERRED EMBODIMENTS

FIG. 1 illustrates a protection circuit 10 intended for use in an automobile electrical system in which operative potential is provided by a battery 11 connected between a terminal 12 at which a positive B+ power supply voltage is provided and a terminal 13 connected to ground and corresponding to a main power ground terminal for the circuit 10. The circuit 10 includes at least one analog sensor 14 having at least a nongrounded voltage output terminal 15 and an analog sensor ground terminal 16. The sensor 14 essentially senses some automobile condition, such as manifold pressure, engine crankshaft position, coolant temperature, etc., and provides a signal between the terminals 15 and 16 indicative thereof. Typically the potential at the analog sensor ground terminal 16 is close to and/or identical with the potential at the main power ground terminal 13. However, the terminal 16 may be at a potential somewhat different than the potential at the power ground terminal due to the remote positioning of the sensor 14.

A microprocessor 17 will essentially act as a monitoring circuit and monitor the output of the sensor 14 so as to produce engine control signals in accordance with the engine conditions sensed by the sensor 14. The microprocessor 17 has its own internal ground reference potential connected to an external power ground terminal 18 of the microprocessor that is directly DC connected to the main power ground terminal 13. In addition, the microprocessor has an external analog sensor ground terminal 19 intended for coupling to a main analog sensor ground terminal 20 to be coupled to the analog sensor ground terminal 16 of the sensor 14. The microprocessor also has an external voltage sensing terminal 21 connected to the output terminal 15 of the sensor 14. Essentially, the microprocessor monitors the output of the sensor 14 by monitoring the potential difference between the terminals 21 and 19 which corresponds to the output of the sensor 14. The external sensor ground terminal 19 is separate from the power ground terminal 13 since it is recognized that there maybe some difference in the exact potential between these terminals due to the remote location of the sensor 14. The providing of a microprocessor analog sensor ground terminal which is separate and different from the main power ground terminal of a microprocessor is conventional in some prior art systems.

In the preferred embodiment of the present invention, the connection between the main analog sensor ground terminal 20 and the microprocessor terminal 19 is provided by a controllable semiconductor switching device, comprising an FET transistor 22 connected in series therebetween. The FET 22 has drain and source electrodes each directly connected to an associated one of the terminals 19 and 20. A gate electrode of the FET 22 is connected to a terminal 23 which corresponds to the output of a DC comparator 24. The terminal 23 is also coupled to a regulated voltage $V_{cc}$ at a terminal 25 through a pull up resistor 26. The terminal 23 is also directly connected to a fault input terminal 27 which corresponds to an external terminal of the microprocessor 17. The negative input of the comparator 24 is directly connected to the main analog sensor ground terminal 20 while the positive input is received from a terminal 28 provided by voltage divider resistors 29 and 30 connected between a reference voltage terminal 31 at which a potential $V_d$ is provided and the power ground reference terminal 13.

Essentially, the components 22 through 31 shown in the FIGURE comprise a circuit 32 (shown in dashed outline in the FIGURE) which prevents the voltage provided at the terminal 19 of the microprocessor from exceeding a predetermined maximum voltage. This is accomplished by having the DC comparator 24 monitor the voltage at the terminal 20 and turn off the normally on FET transistor 22 when the voltage at the terminal 20 exceeds the maximum reference threshold voltage maintained at the terminal 28. Thus normally the ground potential at the terminal 16 is provided to the microprocessor input terminal 19 except during an overvoltage condition at which time the overvoltage is prevented from being coupled to the terminal 19. This prevents damage to the microprocessor due to an excessive voltage being provided at the ground terminal 16 of the sensor. Such an excessive voltage could be provided by creating an accidental short circuit between the battery potential B+ at the terminal 12 and the terminal 16 when installing the sensor 14 or when providing service to the electrical system which includes the sensor 14.

It should be noted that when the voltage at the terminal 20 no longer exceeds the reference voltage at the terminal 28, then the comparator 24 will no longer maintain the FET 22 in an off condition and, by virtue of the pull up resistor 26, the FET will be turned on thus resetting the present circuit to its normal operative condition. In addition, the signal at the terminal 23 is obviously indicative of the occurrence of an overvoltage condition. In the event of such an overvoltage condition, the microprocessor 17 may desire to take some corrective action with regard to engine control. The present invention provides for this by having a direct connection between the terminals 23 and 27 such that the microprocessor receives the fault indicative signal provided at the terminal 23. All of the above described functioning of the circuit 32 occurs regardless of the current which is passed between the main analog sensor ground terminal 20 and the main power ground terminal 13 in the event of a fault which results in the potential at the terminal 16 being substantially different from the ground potential maintained at the main power ground terminal 13. The transistor 22 of the overvoltage circuit 32 provides, during normal no fault operation, a low resistance, low voltage offset connection between the terminals 16 and 19.

The present invention provides a current sensing circuit 33 (shown dashed in the FIGURE) to limit the current which may occur when the potential at the terminal 16 is substantially different from the potential at the terminal 13. Since these terminals are typically approximately at the same potential during non fault operation, typically there will be substantial current flowing between these terminals. However, in case of a fault, such as the accidental application of the B+ potential to the terminal 16, very substantial currents may flow between the terminals 16 and 13. These currents may be so substantial that the physical electrical connections between the terminals may have their current ratings exceeded so as to result in permanent damage to these electrical connections. The preferred embodiment of the present invention prevents this occurrence in the following manner.

The analog sensor ground terminal 16 of the sensor 14 is connected to the main analog sensor ground terminal 20 by a printed circuit board conductive metalization path 34. The terminal 20 is connected by an additional printed circuit board conductive metalization path 35 to one of the drain or source electrodes of an FET transistor 36 within the current sensing circuit 33. The other of the drain or source electrodes of the FET 36 corresponds to a terminal 37 which is connected, via a low resistance current sensing resistor 38, to the power ground terminal 13. A gate electrode of the FET 36 corresponds to an output terminal 39 of an operational amplifier 40. The operational amplifier 40 receives DC power from a terminal 41 at which a voltage $V_A$ is provided. A positive input terminal 42 of the operational amplifier receives a reference voltage by virtue of resistors 43 and 44 connected between a terminal 45 at which a fixed reference potential $V_C$ is provided and the power ground reference terminal 13. A negative input terminal 46 of the operational amplifier is directly connected to the terminal 37. The operation of the current sensing circuit 33 is as follows.

The voltage potential across the sensing resistor 38, which potential appears at the terminal 37, is provided as one input to the operational amplifier 40. A fixed reference threshold is provided at the terminal 42. The operational amplifier essentially controls the conduction of the FET 36 such that the current through the resistor 38 cannot exceed a predetermined maximum current limit determined by the voltage at the terminal 42. This means that the current through the printed circuit metalization path 35, the FET 36 and the sense resistor 38 is maintained below some predetermined maximum current limit. This is selected to be below the rated maximum current limit desired for the printed circuit board metalization path 35. This current limiting also will therefore limit the current passed through the printed circuit board metalization path 34. The end result is that the current sensing circuit 33 insures that regardless of the magnitude of the voltage potential difference between the terminals 16 and 13, excessive current will not pass through the printed circuit board metalizations 34 and 35 causing these metalizations to vaporize or open circuit and create a permanent failure. Thus if a fault exists causing the potential at the terminal 16 to be substantially different than the potential at the terminal 13, the current sensing circuit 33 prevents excessive current. When this fault ceases to exist, the operational amplifier 40 ensures that the FET 36 is on and that there is a low resistance, low voltage offset connection provided between the terminals 16, 20 and 13 wherein this low resistance, low offset connection is desired for accurate analysis, by the microprocessor 17, of the signals provided by the sensor 14.

Preferably, the same printed circuit board on which the metalization paths 34 and 35 are provided will also be utilized for mounting components in the current sensing circuit 33 and the voltage sensing circuit 32. The voltage sensing circuit 32 can be viewed as an "additional" sensing circuit in addition to the current sensing circuit 33. The sensing circuits 32 and 33 are independently operative and each provides separate protection for the circuit components shown in the FIGURE. Each of the sensing circuits also functions to resume normal operation when a fault condition ceases to exist. The microprocessor 17 is informed of the existence of a fault condition by virtue of the connection of the terminal 23 to the fault input terminal 27 of the microprocessor.

Due to the above noted structure, the present embodiment allows the use of separate analog sensor ground inputs and power ground inputs to the microprocessor 17 while preventing damage to the microprocessor by overvoltage as well as preventing excessive current causing permanent damage to the low resistance connection provided between the terminals 16, 20 and 13. This low resistance connection is desired for normal accurate operation of the circuit shown in the FIGURE. While details with regards to how the reference voltages $V_c$, $V_{cc}$ $V_A$ and $V_D$ have not been disclosed herein, these reference voltages can be provided by any suitable regulated power supply circuit which receives the battery voltage B+ provided at the terminal 12. In addition, while the preferred embodiment illustrates the microprocessor 17 receiving a fault indicative signal from the overvoltage protection circuit 32, obviously a similar indication could be provided from the current protection circuit 33 by coupling the signal at the terminal 39 to a fault indicative input terminal of the microprocessor 17.

Preferably, a resistor 47 is provided between the terminals 19 and 13 to prevent potential damage to the microprocessor 17 when transistor 22 is turned off in response to a sensed overvoltage condition. This damage might occur if current flowing out of the microprocessor at terminal 19 did not have a path to ground, external to the microprocessor, when the transistor 22 was turned off.

While we have shown and described specific embodiments of the present invention, further modifications and improvements will occur to those skilled in the art. All such modifications which retain the basic underlying principals disclosed and claimed herein are within the scope of this invention.

We claim:

1. A protection circuit comprising:
 a main analog sensor ground terminal at which normally ground potential is provided by a sensor circuit;
 a main power ground terminal, separate from said main analog sensor ground terminal, at which ground potential is provided;
 a monitoring circuit having at least first and second separate input terminals, said first input terminal coupled to said main analog ground terminal and said second input terminal separately coupled to said main power ground terminal; and
 means for normally providing a low resistance connection between said main analog sensor ground terminal and said main power ground terminal;
 wherein the improvement comprises,
 current sensing means for sensing current passed through said low resistance connection, developing a signal magnitude indicative thereof and utilizing said signal magnitude to limit said current to no more than a predetermined maximum current limit; and
 additional means, in addition to said current sensing means, for sensing the voltage at said main analog sensing ground terminal and, in response thereto, preventing the voltage at said first input terminal from exceeding a predetermined maximum voltage.

2. A protection circuit according to claim 1 wherein said monitoring circuit comprises a microprocessor with separate external sensor and power ground terminals corresponding to said first and second separate input terminals of said monitoring circuit, respectively.

3. A protection circuit according to claim 2 wherein said low resistance connection is external to said microprocessor.

4. A protection circuit according to claim 3 wherein said additional means comprises means for disconnecting said main analog sensor ground terminal from said first said input terminal of said monitoring circuit in response to the voltage at said main analog sensor ground terminal exceeding a predetermined maximum voltage.

5. A protection circuit according to claim 4 wherein said external sensor ground terminal of said microprocessor and said main power ground terminal are each DC coupled to said main analog sensor ground terminal, and wherein said current sensing means and said additional means selectively modify these DC connections.

6. A protection circuit according to claim 5 wherein said microprocessor has an external fault input terminal coupled to at least one of said current sensing and additional means for receiving a fault indicative signal in response to the operation of at least one of said current sensing and additional means modifying said DC connections.

7. A protection circuit according to claim 6 which includes a sensor having an output terminal connected to an external voltage sensing input terminal of the microprocessor, said sensor having an analog ground terminal directly connected to said main analog sensor ground terminal, said protection circuit including at least one circuit board metalization path electrically connecting said sensor analog ground terminal and said main power ground terminal, via said low resistance connection, said metalization path capable of carrying a predetermined maximum current.

8. A protection circuit according to claim 7 wherein said current sensing means limits the current through said low resistance connection to less than the maximum current which the circuit board metalization path is capable of conducting, whereby current through said metalization path is limited.

9. A protection circuit according to claim 8 wherein said metalization path is provided on a printed circuit board on which circuit components of said current sensing and additional means are provided.

10. A protection circuit according to claim 9 wherein each of said current sensing and additional means includes at least one semiconductor switching device as one of its components.

11. A protection circuit according to claim 10 wherein said current sensing means includes a current sensing resistor connected in series with a first controllable semiconductor switching device between said main power ground terminal and said main analog sensor ground terminal, said resistor and said controllable semiconductor switching device, when conductive, providing said low resistance connection, 12. A protection circuit according to claim 11 wherein each of said current sensing and additional means includes an effective comparator circuit whose output controls a controllable semiconductor switching device.

13. A protection circuit according to claim 12 wherein said additional means includes a second controllable semiconductor switching device connected in series between said main analog sensor ground terminal and said external sensor ground terminal corresponding to the second input terminal of the monitoring circuit.

14. A protection circuit according to claim 13 wherein said external power ground terminal of said microprocessor corresponds to the main ground reference connection of the microprocessor.

15. A protection circuit according to claim 13 wherein said first controllable semiconductor device comprises an operational amplifier and wherein said second controllable semiconductor device comprises a DC comparator.

* * * * *

UNITED STATES PATENT AND TRADEMARK OFFICE
CERTIFICATE OF CORRECTION

PATENT NO. : 4,969,062

DATED : November 6, 1990

INVENTOR(S) : Barylak et al.

It is certified that error appears in the above-identified patent and that said Letters Patent is hereby corrected as shown below:

In the Abstract:

Col. 2, line 1, after "analog" insert --sensor--.

Col. 2, line 2, after "nal" insert --(20) corresponding to an analog ground terminal--.

Col. 2, line 8, delete "terminals" and insert --terminal--.

Signed and Sealed this

Twenty-third Day of June, 1992

Attest:

DOUGLAS B. COMER

*Attesting Officer*   Acting Commissioner of Patents and Trademarks